US012691751B2

(12) United States Patent
Ueki et al.

(10) Patent No.: US 12,691,751 B2
(45) Date of Patent: Jul. 28, 2026

(54) ESTIMATING UNIT FOR GAS INSIDE SECONDARY BATTERY AND VEHICLE

(71) Applicant: SUBARU CORPORATION, Tokyo (JP)

(72) Inventors: Takahiro Ueki, Tokyo (JP); Kotaro Nakamura, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 764 days.

(21) Appl. No.: 18/186,489

(22) Filed: Mar. 20, 2023

(65) Prior Publication Data

US 2023/0311640 A1 Oct. 5, 2023

(30) Foreign Application Priority Data

Apr. 4, 2022 (JP) ................................. 2022-062485

(51) Int. Cl.
B60K 13/04 (2006.01)
B60K 1/04 (2019.01)
(Continued)

(52) U.S. Cl.
CPC ................ B60K 13/04 (2013.01); B60K 1/04 (2013.01); B60K 13/02 (2013.01); B60L 1/00 (2013.01);
(Continued)

(58) Field of Classification Search
CPC .......... B60K 13/04; B60K 1/04; B60K 13/02; B60K 2001/0438; B60L 1/00;
(Continued)

(56) References Cited

U.S. PATENT DOCUMENTS

| | | | | | |
|---|---|---|---|---|---|
| 3,652,915 A | * | 3/1972 | Eberts | ............... | H02J 7/007182 |
| | | | | | 320/152 |
| 6,198,254 B1 | * | 3/2001 | Satake | .................. | H01M 10/48 |
| | | | | | 429/61 |

(Continued)

FOREIGN PATENT DOCUMENTS

| | | | | | | |
|---|---|---|---|---|---|---|
| CN | 110444828 A | * | 11/2019 | .......... | H01M 10/488 |
| CN | 114002385 A | * | 2/2022 | ............ | H01M 10/48 |
| JP | 58133464 A | * | 8/1984 | ............ | F02M 25/10 |
| JP | 2010-006153 A | | 1/2010 | | |
| JP | 2020-198738 A | | 12/2020 | | |
| JP | 2022063991 A | * | 4/2022 | ............ | Y02E 60/10 |

OTHER PUBLICATIONS

K. Kumai et al., "Degradation Mechanism of Li-ion Cell after Long Cycling—Mechanism of Electrolyte Decomposition reactions-," Report No. T99040 issued by Central Research Institute of Electric Power Industry in Jun. 2000, with English abstract.

*Primary Examiner* — Jared Fureman
(74) *Attorney, Agent, or Firm* — Rimon P.C.

(57) ABSTRACT

A gas estimating unit configured to estimate an amount and a composition of a gas generated inside a secondary battery includes at least one processor and at least one memory electrically coupled to each other. The at least one processor is configured to detect a presence or absence of a gas generating period. The gas generating period is a period for which the gas is generated inside the secondary battery while the secondary battery is in one or both of an over-charging state in which the secondary battery exceeds a voltage limit and a high-temperature state in which the secondary battery exceeds a temperature limit.

12 Claims, 8 Drawing Sheets

(51) Int. Cl.

| | |
|---|---|
| *B60K 13/02* | (2006.01) |
| *B60L 1/00* | (2006.01) |
| *B60L 58/18* | (2019.01) |
| *H01M 10/48* | (2006.01) |

(52) U.S. Cl.
CPC ............. *B60L 58/18* (2019.02); *H01M 10/48* (2013.01); *B60K 2001/0438* (2013.01); *B60L 2240/54* (2013.01); *H01M 2220/20* (2013.01)

(58) Field of Classification Search
CPC ................ B60L 58/18; B60L 2240/54; B60L 2240/545; B60L 2240/547; B60L 3/0046; H01M 10/48; H01M 2220/20; H01M 2010/4271; H01M 10/42; H02J 7/60; H02J 7/61; H02J 7/62; H02J 7/63; H02J 7/64; H02J 7/65; H02J 7/973; H02J 7/975; H02J 7/977; H02J 7/0029; H02J 7/00302; H02J 7/00304; H02J 7/00306; H02J 7/00308; H02J 7/00309
USPC ................................................. 320/132, 147
See application file for complete search history.

(56) References Cited

U.S. PATENT DOCUMENTS

| | | | | |
|---|---|---|---|---|
| 6,204,769 | B1* | 3/2001 | Arai ...................... | H01M 10/48 |
| | | | | 340/455 |
| 6,246,216 | B1* | 6/2001 | Satake ............ | G01R 19/16542 |
| | | | | 320/147 |
| 9,553,465 | B2* | 1/2017 | Raghavan ............ | G01R 31/382 |
| 10,297,890 | B2* | 5/2019 | Mulder ................. | H01M 10/44 |
| 10,763,554 | B2* | 9/2020 | Yoshida .............. | H01M 10/445 |
| 11,552,352 | B2* | 1/2023 | Mulder ................... | H01M 4/32 |
| 2016/0097821 | A1* | 4/2016 | Eifert ................ | G01R 31/3648 |
| | | | | 702/63 |
| 2018/0062210 | A1* | 3/2018 | Kim ................... | H01M 10/484 |
| 2018/0194245 | A1* | 7/2018 | Mohr ................... | H02J 7/0029 |
| 2023/0129184 | A1* | 4/2023 | Sakamoto .......... | H01M 10/625 |
| | | | | 429/53 |
| 2024/0339718 | A1* | 10/2024 | Lorenz ............... | H01M 50/358 |
| 2024/0426928 | A1* | 12/2024 | Kinoshita .......... | H02J 7/00719 |
| 2025/0007082 | A1* | 1/2025 | Lorenz .............. | H01M 50/358 |

\* cited by examiner

| | GAS COMPOSITION | | | | | |
| --- | --- | --- | --- | --- | --- | --- |
| | $O_2$ | $N_2$ | $CO_2$ | CO | $CH_4$ | ... |
| CUMULATIVE AMOUNT [ml] | A1 | B1 | C1 | D1 | E1 | ... |

FIG. 6B

| | GAS COMPOSITION | | | | | |
| --- | --- | --- | --- | --- | --- | --- |
| | $O_2$ | $N_2$ | $CO_2$ | CO | $CH_4$ | ... |
| CUMULATIVE AMOUNT [ml] | A2 | B2 | C2 | D2 | E2 | ... |

FIG. 8

| GAS COMPOSITION | | | | | | |
|---|---|---|---|---|---|---|
| | $O_2$ | $N_2$ | $CO_2$ | CO | $CH_4$ | ⋮ |
| CUMULATIVE AMOUNT [ml] | A1 | B1 | C1 | D1 | E1 | ⋮ |
| FLAMMABILITY FLAG | 1 | 0 | 0 | 1 | 1 | ⋮ |
| TOXICITY FLAG | 0 | 0 | 1 | 1 | 0 | ⋮ |

ESTIMATING UNIT FOR GAS INSIDE SECONDARY BATTERY AND VEHICLE

CROSS-REFERENCE TO RELATED APPLICATIONS

The present application claims priority from Japanese Patent Application No. 2022-062485 filed on Apr. 4, 2022, the entire contents of which are hereby incorporated by reference.

BACKGROUND

The disclosure relates to a gas estimating unit for estimating the amount and the composition of gas inside a secondary battery such as a lithium-ion secondary battery, and a vehicle.

In present-day society, automobiles, for example, are very convenient as the means of transportation, and various types of vehicles are running on the road in everyday life. These days, to take countermeasures against the depletion of resources and to make resources sustainable, electric vehicles, which install a rechargeable and dischargeable secondary battery, such as a lead-acid battery and a lithium-ion secondary battery, and a drive motor, are also becoming popular.

When a secondary battery is exposed to an abnormal environment, such as overcharging and overheating, gas may fill the inside of the secondary battery. To deal with such an issue, Japanese Unexamined Patent Application Publication (JP-A) No. 2020-198738, for example, discloses a structure in which gas generated in a battery, which is constituted by a secondary battery, in a vehicle due to an abnormality of the battery is safely exhausted to the outside of the vehicle via an in-vehicle catalyst device. In another example, JP-A No. 2010-6153 discloses a technology for taking suitable measures against gas generated inside a battery, for example, by blocking the gas, exhausting the gas, and ventilating the vehicle, in accordance with the state of the vehicle or the density of the gas so that the gas does not enter the vehicle compartment.

SUMMARY

An aspect of the disclosure provides a gas estimating unit. The gas estimating unit is configured to estimate an amount and a composition of a gas generated inside a secondary battery, which is a rechargeable and dischargeable battery. The gas estimating unit includes at least one processor and at least one memory electrically coupled to the at least one processor. The at least one processor is configured to detect a presence or absence of a gas generating period. The gas generating period is a period for which the gas is generated inside the secondary battery while the secondary battery is in one or both of an overcharging state and a high-temperature state. The overcharging state is a state in which the secondary battery exceeds a voltage limit so as to be unable to be used properly. The high-temperature state is a state in which the secondary battery exceeds a temperature limit so as to be unable to be used properly. The at least one processor is configured to estimate the amount and the composition of the gas, based on an integration result of voltage values of the secondary battery during the gas generating period.

An aspect of the disclosure provides a vehicle. The vehicle includes an engine, a secondary battery, a gas inlet pipe, a first on/off valve, and the above-described gas estimating unit. The engine is configured to drive the vehicle. The secondary battery is to be used at least for supplying electricity to a device installed in the vehicle. The gas inlet pipe is configured to couple the secondary battery to an air intake channel leading to the engine. The first on/off valve is configured to control opening and closing of the gas inlet pipe.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to describe the principles of the disclosure.

FIG. 1 is a schematic view of a vehicle according to an embodiment;

FIGS. 6A and 6B schematically illustrate table data indicating the cumulative amount of each component of gas used in the gas estimating/recording processing in FIG. 4;

FIG. 8 schematically illustrates table data indicating the cumulative amount of each component of gas according to a modified example.

DETAILED DESCRIPTION

Figure 2:
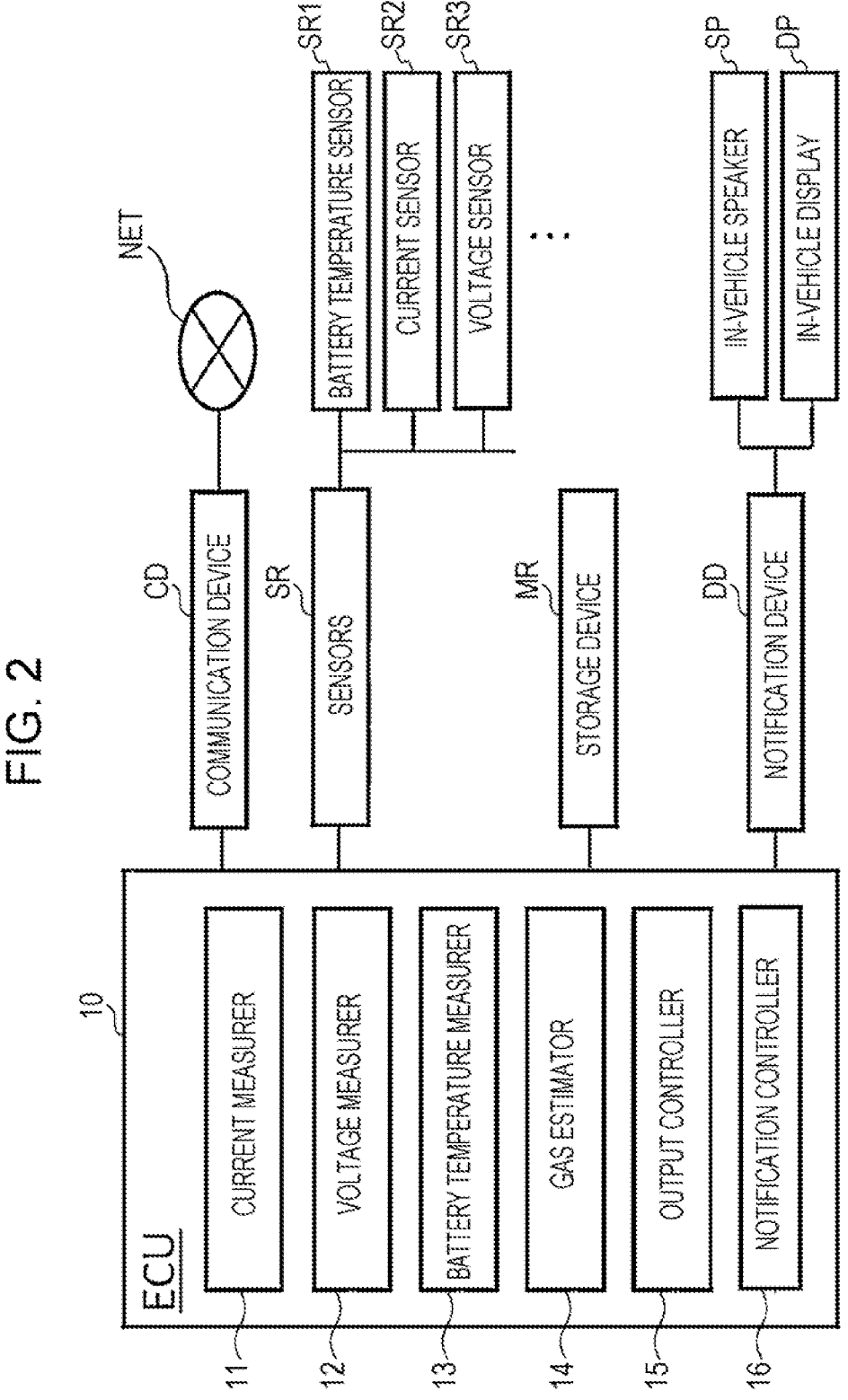
FIG. 2 is a functional block diagram of the vehicle including a gas estimating unit that estimates the amount and the composition of gas inside a secondary battery according to the embodiment.
Figure 3:
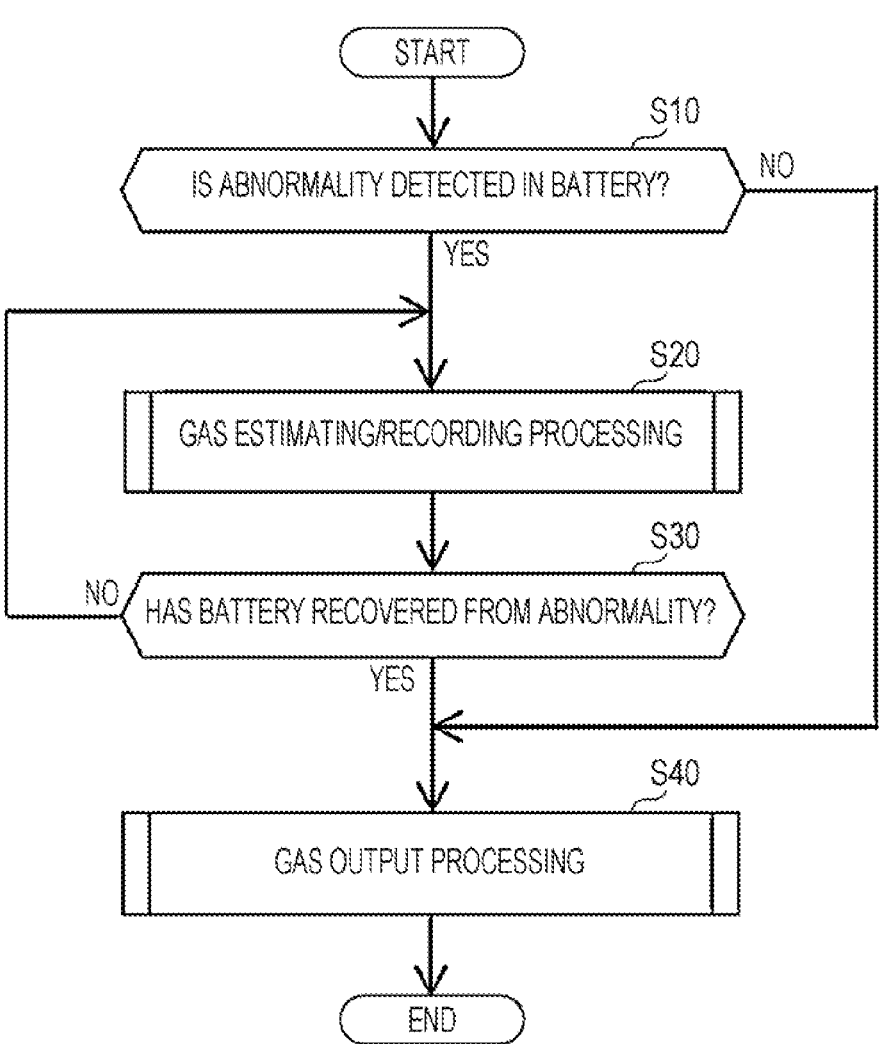
FIG. 3 is a flowchart illustrating a main procedure for dealing with gas inside a secondary battery according to the embodiment.
Figure 4:
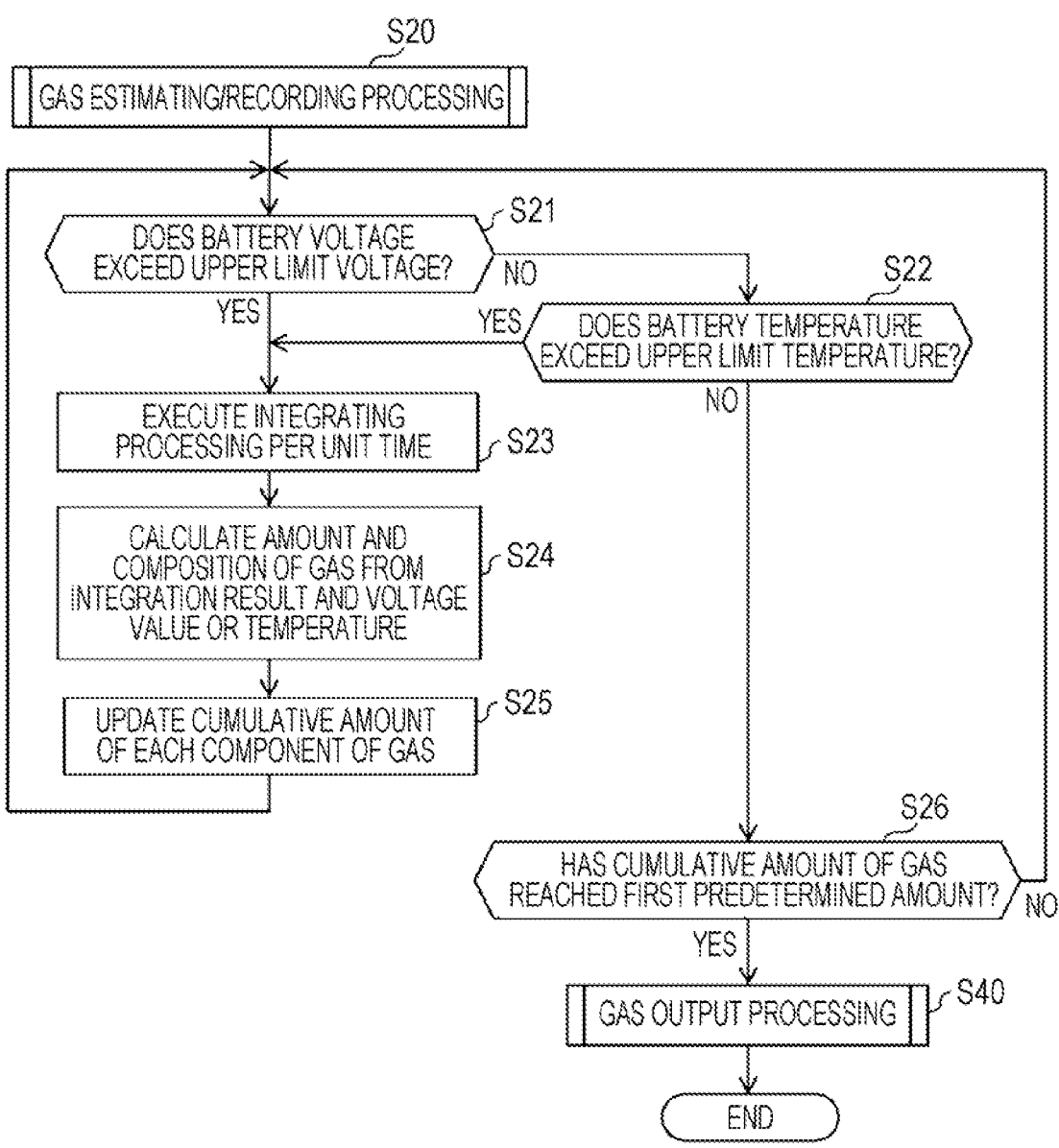
FIG. 4 is a flowchart illustrating gas estimating/recording processing included in the main procedure in the flowchart of FIG. 3.

Currently available technologies including those disclosed in JP-A Nos. 2020-198738 and 2010-6153 do not sufficiently meet the market needs, and there are the following issues to be addressed.

For example, JP-A No. 2020-198738 does not deal with gas filling inside a battery in terms of the composition of the gas. That is, with this technology, it is not possible to exhaust gas from a battery in a suitable manner in accordance with the components forming the gas. In JP-A No. 2010-6153, a density sensor for detecting the density of gas generated inside a battery is used. This increases the number of parts installed in a vehicle. Additionally, extra measures are to be taken in case of a failure of the density sensor and proactive measures, such as maintenance, are to be taken to prevent a failure of the density sensor.

The disclosure has been made in view of the above-described issues as an example. It is desirable to provide a gas estimating unit that is able to estimate the amount and the composition of gas generated inside a secondary battery at a lower cost.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description. For the configurations of elements other than those discussed in detail below, technologies and configurations of the elements of vehicles which install a known secondary battery system including those disclosed in JP-A Nos. 2020-198738 and 2010-6153 may suitably be used.

(Vehicle 100)

Figure 1:
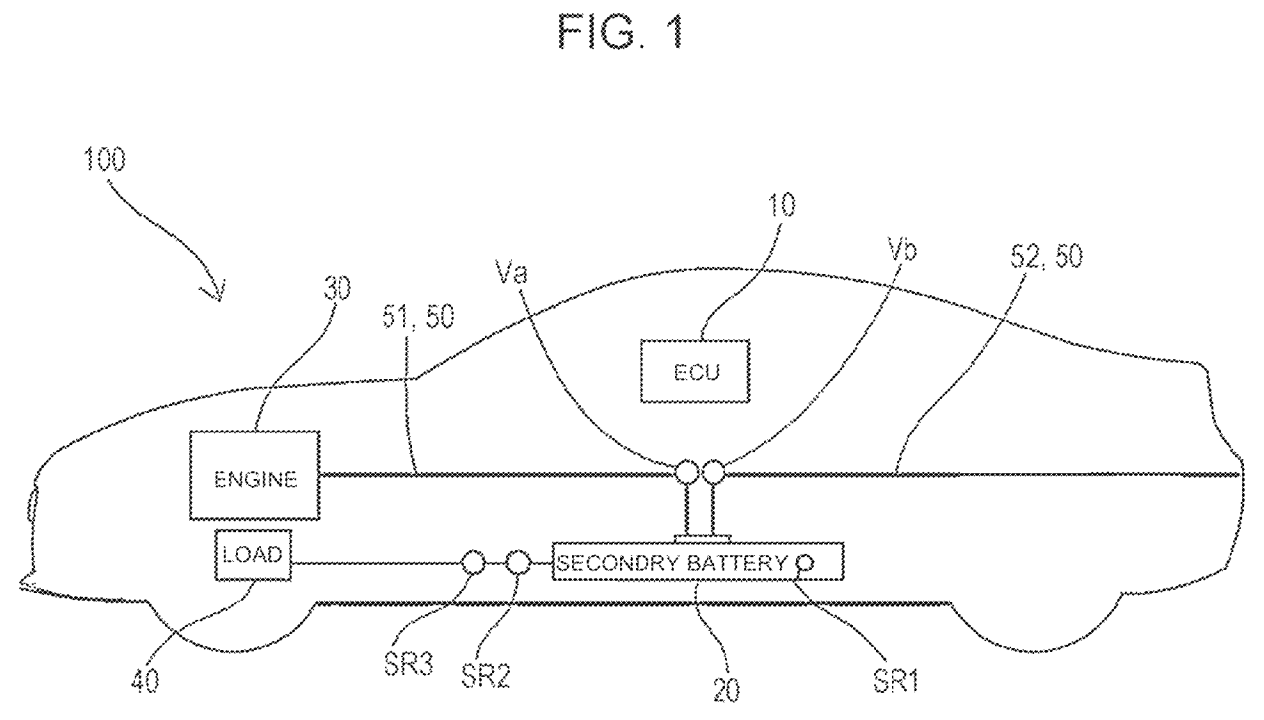

The configuration of a vehicle 100 in the embodiment will first be described below with reference to FIG. 1. The vehicle 100 includes a controller 10, a secondary battery 20, an engine 30, a load 40, a piping system 50, and sensors SR, for example. These elements will be explained in detail below. As an example of the vehicle 100, various known hybrid cars which install a known inverter and a known electric motor as the load 40 may be used.

[Controller 10]

The configuration of the controller 10 in the vehicle 100 will now be described below with reference to FIGS. 1 and 2.

The controller 10 of the embodiment is an electronic control unit (ECU) including one or more known processors and one or more memories electrically coupled to the processor or the processors. In one example, the controller 10 serves as a unit that estimates the amount and the composition of gas generated inside the secondary battery 20, which is a rechargeable and dischargeable battery. Hereinafter, the controller 10 will be explained as a unit that estimates the amount and the composition of gas generated inside the secondary battery 20 (hereinafter called the gas estimating unit 10).

As illustrated in FIG. 2, the gas estimating unit 10 of the embodiment includes a current measurer 11, a voltage measurer 12, a battery temperature measurer 13, a gas estimator 14, an output controller 15, and a notification controller 16. Each of these elements is constituted by a program implementing a corresponding function. The gas estimating unit 10 is able to send and receive information to and from other known in-vehicle ECUs, such as a hybrid control ECU and an engine control ECU, loaded in the vehicle 100. Alternatively, the gas estimating unit 10 may be integrated in the hybrid control ECU or a charging control ECU as one function.

As illustrated in FIG. 2, the gas estimating unit 10 may be connected to a known external network NET, such as the internet, via a known communication device CD. The external network NET is not limited to the internet. For example, a known information communication network that implements inter-vehicle communication to send and receive various types of information using wireless communication may be used.

The gas estimating unit 10 is also able to receive various detection signals from the sensors SR installed in the vehicle 100. As illustrated in FIG. 1, examples of the sensors SR are a battery temperature sensor SR1, a current sensor SR2, and a voltage sensor SR3, which are all known. The battery temperature sensor SR1 can measure the temperature of the secondary battery 20. The current sensor SR2 and the voltage sensor SR3 are disposed between the secondary battery 20 and the load 40. In addition to these sensors, the sensors SR may include various in-vehicle sensors, such as an outside temperature sensor and a vehicle velocity sensor, which are usually installed in the vehicle 100.

The gas estimating unit 10 is electrically coupled to a known notification device DD installed in the vehicle 100 so as to inform an occupant of the vehicle 100 of the state of the secondary battery 20, for example, via the notification device DD. Examples of the notification device DD is a known in-vehicle speaker SP and a known in-vehicle display DP installed in the vehicle 100.

The gas estimating unit 10 may be able to send and receive information to and from a known storage device MR, such as a hard disk or a solid state drive (SSD). In the storage device MR in the embodiment, various programs for executing a gas estimating method, which will be discussed later, may be stored. The storage device MR may be installed in the vehicle 100. Alternatively, the storage device MR may be provided as an external server (cloud server) outside the vehicle 100 and can be accessed via the external network NET.

The current measurer 11 measures the value of a current flowing through the secondary battery 20. In one example, the current measurer 11 measures the current value of the secondary battery 20 coupled to the load 40 by using the current sensor SR2.

The voltage measurer 12 measures the value of the voltage across the terminals of the secondary battery 20. In one example, the voltage measurer 12 measures the voltage value of the secondary battery 20 coupled to the load 40 by using the voltage sensor SR3.

The battery temperature measurer 13 measures the temperature of the secondary battery 20. In one example, the battery temperature measurer 13 measures the temperature of the secondary battery 20 coupled to the load 40 by using the battery temperature sensor SR1.

The gas estimator 14 estimates the amount and the composition of gas generated inside the secondary battery 20. The gas estimator 14 estimates the amount and the composition of gas generated inside the secondary battery 20 during a period of either one of an overcharging state and a high-temperature state, which will be discussed later.

The amount and the composition of gas can be determined in advance by experiment or simulation using the following technique, for example.

Publicly known literature, such as "Degradation Mechanism of Li-ion Cell after Long Cycling Report No: T99040" issued by Central Research Institute of Electric Power Industry in June 2000, shows that the electrolyte decomposition reaction in lithium-ion cells varies depending on the voltage or the temperature. This literature also shows examples of the composition of generated gases at nominal operating voltage, overcharging, and over-discharging in Table 2. According to publicly known literature, such as the above-described literature, it can be said that the composition of gas generated in a lithium-ion cell is different depending on the voltage of the lithium-ion cell.

By determining the following factors of a lithium-ion secondary battery: the composition of an electrolyte in the secondary battery; whether the secondary battery is in the overcharging state; whether the secondary battery is in the high-temperature state; and the voltage of the secondary battery in each of the overcharging state and the high-temperature state, the composition of gas generated in the secondary battery can be specified by preliminary experiment or simulation since the electrolyte decomposition is closely related to the voltage of the secondary battery and the time elapsed. Regarding the amount of gas to be generated, too, it is possible to determine how much of gas to be generated in accordance with each level of voltage by the above-described preliminary experiment or simulation.

"Overcharging state" in the embodiment refers to a state in which the voltage of a secondary battery exceeds the upper limit voltage (rated voltage, for example) preset by a manufacturer, for example, at which the secondary battery can be used stably and properly. In the embodiment, the voltage value is used to determine whether the secondary battery is in the overcharging state. As the parameter for determining the overcharging state, however, the state of charge (SOC) or the capacitance (Ah) of the secondary battery may be used, instead of the voltage.

Likewise, "high-temperature state" in the embodiment refers to a state in which the temperature of a secondary battery exceeds the upper limit temperature preset by a manufacturer, for example, at which the secondary battery can be used stably and properly. In the embodiment, the temperature at which the secondary battery can safely be operated is used to determine whether the secondary battery is in the high-temperature state. As the reference for determining the high-temperature state, however, the temperature at which the electrolyte starts to decompose may be used, instead of the temperature at which the secondary battery can safely be operated.

The amount and the composition of gas generated in the secondary battery in the overcharging state, which are found by preliminary experiment or simulation as described above, are defined in accordance with each voltage value and are formed into an overcharging-state gas composition table. Data on the overcharging-state gas composition table (hereinafter called the overcharging-state gas composition table data) is stored in the storage device MR. Likewise, the amount and the composition of gas generated in the secondary battery in the high-temperature state, which are found by preliminary experiment or simulation as described above, are defined in accordance with each voltage value and are formed into a high-temperature-state gas composition table. Data on the high-temperature-state gas composition table (hereinafter called the high-temperature-state gas composition table data) is stored in the storage device MR.

This enables the gas estimator 14 to estimate the amount and the composition of gas generated in the secondary battery by checking the integral volume of gas per unit time and the corresponding voltage (average voltage) during a period of one of the overcharging state and the high-temperature state against the corresponding one of the overcharging-state gas composition table data and the high-temperature-state gas composition table data stored in the storage device MR.

The gas estimator 14 in the embodiment also accumulates the amount and update the composition of gas generated inside the secondary battery 20 and to store the accumulated amount and the updated composition of the generated gas. The gas estimator 14 uses a graph in which the time of the overcharging state is set on the horizontal axis and the voltage of the secondary battery 20 is set on the vertical axis and integrates the area of a range which exceeds the upper limit voltage in this graph. This will be discussed later.

In one example, based on the estimated amount and composition of the secondary battery 20, the gas estimator 14 calculates the cumulative amount of each component of the generated gas and stores the calculation results, as illustrated in FIGS. 6A and 6B.

The output controller 15 determines the output mode of gas retained in the secondary battery 20, based on the cumulative amount of each component of the gas.

The output controller 15 also determines how to output the gas, based on the output mode. In one example, the output controller 15 may perform control to output the gas generated inside the secondary battery 20 to an air intake channel leading to an engine 30 as a combustion assisting gas. In another example, the output controller 15 may perform control to exhaust the gas to the outside of the vehicle 100 without inputting it into the air intake channel.

The notification controller 16 provides notification via the in-vehicle speaker SP and/or the in-vehicle display DP. For example, based on the estimation result of the gas estimator 14, the notification controller 16 can notify an occupant of the vehicle 100, for example, of the state of the vehicle 100 via the in-vehicle speaker SP and/or the in-vehicle display DP. This makes it possible to let the occupant know the state of the secondary battery 20 speedily.

The secondary battery 20 in the embodiment is used for at least supplying electricity to the in-vehicle devices installed in the vehicle 100. The secondary battery 20 supplies electricity to the load 40, which will be discussed later, and also to charge electricity generated in the load 40 according to the necessity. As the secondary battery 20, various known secondary batteries, such as a lithium-ion battery, a lead-acid battery, and a nickel-metal hydride battery, may be used.

The engine 30 drives the vehicle 100. As the engine 30, various known engines that generate power by means of gas combustion may be used. For example, a reciprocating engine that generates power by burning gasoline and a gas turbine engine that generates power by burning gas may be used.

As the load 40, various known loads that can be driven by electricity of a secondary battery installed in a vehicle may be used. For example, an electric motor and an inverter that can drive the vehicle 100 may be used. In the embodiment, a known electric motor that can be installed in a hybrid car is applied as an example of the load 40.

The piping system 50 is constituted by a gas inlet pipe 51 and a gas outlet pipe 52. The gas inlet pipe 51 couples the secondary battery 20 to the air intake channel (not illustrated) leading to the engine 30. The gas outlet pipe 52 communicates the secondary battery 20 to the outside of the vehicle 100. In one example, the piping system 50 may also include a first on/off valve Va and a second on/off valve Vb. The first on/off valve Va is disposed at the gas inlet pipe 51 to control the opening/closing of the gas inlet pipe 51. The second on/off valve Vb is disposed at the gas outlet pipe 52 to control the opening/closing of the gas outlet pipe 52. As the first on/off valve Va and the second on/off valve Vb, various known valves, such as a solenoid valve, which can control to let gas flow in, are applicable.

(How to Deal with Gas Inside Secondary Battery)

A description will now be given, with reference to FIGS. 3 through 7, of processing executed by the gas estimating unit 10 of the embodiment to deal with gas inside the secondary battery 20.

After the system power source of the vehicle 100 is turned ON, it is determined in step S10 whether an abnormality has occurred in the secondary battery 20 installed in the vehicle 100. In one example, in the embodiment, if the secondary battery 20 is in one or both of the above-described overcharging state and high-temperature state, the gas estimating unit 10 determines that an abnormality has occurred in the secondary battery 20. If the gas estimating unit 10 determines in step S10 that no abnormality has occurred in the secondary battery 20, it proceeds to a gas output processing routine in step S40.

If an abnormality is detected in the secondary battery 20 of the vehicle 100 in step S10, gas estimating/recording processing is executed in step S20.

The gas estimating/recording processing in step S20 will be discussed below with reference to FIGS. 4 through 6B.

In step S21, the gas estimating unit 10 determines whether the voltage (voltage value) of the secondary battery 20 exceeds the upper limit voltage. In one example, the voltage measurer 12 of the gas estimating unit 10 measures the voltage value of the secondary battery 20 by using the voltage sensor SR3 and determines whether the measured voltage value exceeds the upper limit voltage.

If it is found in step S21 that the voltage value of the secondary battery 20 does not exceed the upper limit voltage, the gas estimating unit 10 determines in step S22 whether the temperature of the secondary battery 20 exceeds the upper limit temperature. In one example, the battery temperature measurer 13 of the gas estimating unit 10 measures the temperature of the secondary battery 20 by using the battery temperature sensor SR1 and determines whether the measured temperature exceeds the upper limit temperature. If it is found in step S22 that the temperature of the secondary battery 20 does not exceed the upper limit temperature, the gas estimating unit 10 proceeds to step S26.

If it is found in step S21 that the voltage value of the secondary battery 20 exceeds the upper limit voltage or if it is found in step S22 that the temperature of the secondary battery 20 exceeds the upper limit temperature, the following integrating processing is executed in step S23. In steps S21 and S22, it is determined whether a gas generating period is detected in the secondary battery 20. During the gas generating period, the secondary battery 20 is in one or both of the overcharging state and the high-temperature state in which the secondary battery 20 is no longer stably and properly operated.

An example of integrating processing executed when the voltage of the secondary battery 20 exceeds the upper limit voltage will be explained below with reference to FIG. 5.

Figure 5:
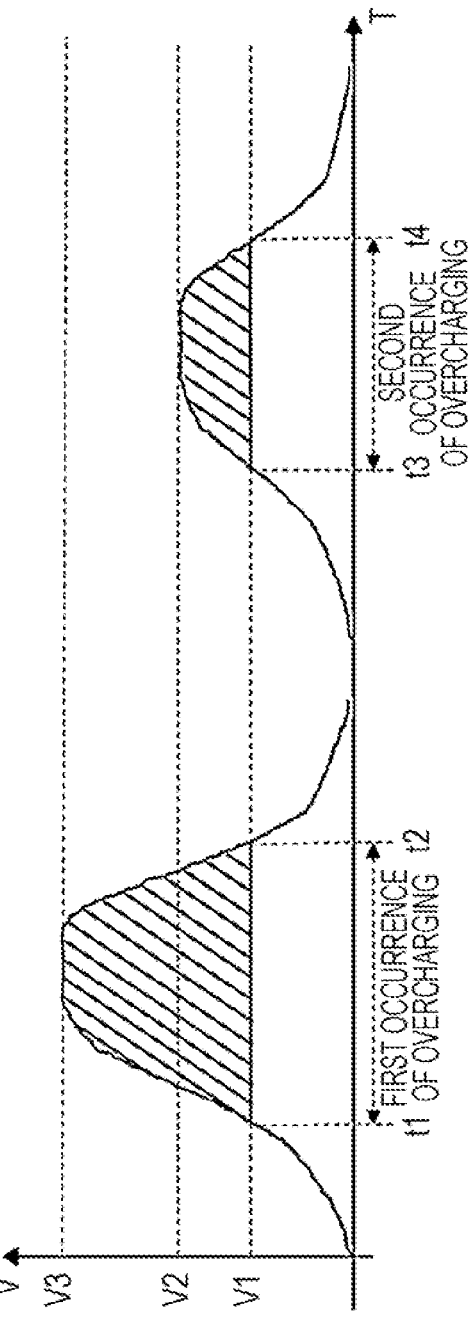
FIG. 5 is a graph for explaining integrating processing executed in the gas estimating/recording processing in FIG. 4.

FIG. 5 is a graph in which the time t is set on the horizontal axis, while the voltage of the secondary battery 20 is set on the vertical axis.

As is seen from FIG. 5, at time t1, the voltage value of the secondary battery 20 exceeds the upper limit voltage V1, that is, the secondary battery 20 enters the overcharging state, and the voltage value then reaches the largest voltage value V3, then drops to the upper limit voltage V1 at time t2, and becomes lower, that is, the secondary battery 20 enters a normal state. In other words, the period from time t1 to time t2 is a period for which an abnormality has occurred in the secondary battery 20 (first occurrence of overcharging) and corresponds to a period for which gas is generated in the secondary battery 20 (first gas generating period).

The gas estimator 14 of the gas estimating unit 10 estimates the amount and the composition of gas generated inside the secondary battery 20 during the period from time t1 to time t2 (gas generating period) according to the above-described integrating processing.

In one example, in step S23, the gas estimator 14 first executes integrating processing per unit time for a range which exceeds the upper limit voltage V1 in the left side of the graph in FIG. 5. As "per unit time", a desired time may be set. For example, a time interval based on the reaction speed of the electrolyte may be used as "per unit time".

Then, in step S24, based on the integration result per unit time obtained in step S23 and the voltage (average voltage) in the range subjected to integrating processing, the gas estimator 14 refers to the overcharging-state gas composition table data obtained by preliminary experiment or simulation and estimates (calculates) the amount and the composition of gas generated inside the secondary battery 20.

The amount and the composition of gas to be generated inside the secondary battery 20 have already been determined by preliminary experiment or simulation in accordance with each of multiple voltages higher than the upper limit voltage. The gas estimator 14 thus refers to the overcharging-state gas composition table data to look for the voltage value and the area that match the integration result and the average voltage value obtained in step S23. The gas estimator 14 then determines the amount and the composition associated with the matched voltage value and area in the gas composition table data as the amount and the composition of gas generated inside the secondary battery 20.

Then, in step S25, as indicated by cumulative gas data in FIG. 6A, based on the estimated amount and composition of gas, the gas estimator 14 calculates the cumulative amount of each component of the gas and stores the calculation results in a storage, such as the storage device MR.

After step S25, the gas estimating unit 10 returns to step S21 and determines whether the voltage of the secondary battery 20 exceeds the upper limit voltage. As illustrated in FIG. 5, in the embodiment, the period from time t1 to time t2 is a gas generating period for which the secondary battery 20 is in the overcharging state. The gas estimator 14 thus repeats steps S23 through S25 during the period from time t1 to time t2. During the period from time t1 to time t2, the gas estimator 14 updates the cumulative gas data every time it executes step S25. As a result, in the zone from time t1 to time t2 indicated by the hatched portion in FIG. 5, the area per unit time is repeatedly calculated every time the gas estimator 14 executes step S25, and the amount and the composition of the gas determined based on the calculated area per unit time is sequentially reflected in the cumulative gas data.

In this manner, in the embodiment, every time the secondary battery 20 enters the overcharging state, the amount and the composition of gas inside the secondary battery 20 are determined, and the determined amount is added to the previous amount and the previous composition is updated to the determined composition. Then, the resulting cumulative gas data is stored in a storage, such as the storage device MR.

As illustrated in FIG. 5, after time t2, at time t3, the voltage value of the secondary battery 20 exceeds the upper limit voltage V1 again, that is, the secondary battery 20 reenters the overcharging state, and then, the voltage value reaches the largest voltage value V2, then drops to the upper limit voltage V1 at time t4, and becomes lower, that is, the secondary battery 20 enters a normal state. In other words, the period from time t3 to time t4 is a period for which an abnormality has occurred in the secondary battery 20 (second occurrence of overcharging) and corresponds to a period for which gas is generated in the secondary battery 20 (second gas generating period).

As in the period from time t1 to time t2, the gas estimator 14 estimates the amount and the composition of gas generated inside the secondary battery 20 during the period from time t3 to time t4 according to the above-described integrating processing. In one example, the gas estimator 14 integrates per unit time the area of a range which exceeds the upper limit voltage V1 in the right side of the graph in FIG. 5 and repeats steps S23 through S25 during the period from time t3 to time t4 (gas generating period) in FIG. 5.

Then, based on the integration result per unit time obtained in step S23 and the voltage (average voltage) in the range subjected to integrating processing, the gas estimator 14 refers to the overcharging-state gas composition table data obtained by preliminary experiment or simulation and estimates (calculates) the amount and the composition of gas generated inside the secondary battery 20.

When a battery is repeatedly overcharged, it deteriorates over time. Hence, from the second occurrence of the over-charging state onwards, fewer components in the battery electrolyte can react. The gas estimator 14 may thus calculate the amount and the composition of gas by multiplying the generated amount of gas by a deterioration factor in accordance with the degree of deterioration of the secondary battery 20. The deterioration factor is determined in accordance with the degree of deterioration of a battery and can be obtained by known art, experiment, or simulation.

In one example, the gas estimator 14 adds the current amount of gas generated inside the secondary battery 20 to the previous amount and also updates the previous composition during the period from time t3 to time t4 so as to update the cumulative gas data. That is, as a result of updating the amount and the composition of gas generated inside the secondary battery 20 in the second occurrence of an abnormality (overcharging state), after time t4, the cumulative gas data is updated and indicates the latest cumulative amount of gas, as illustrated in FIG. 6B.

In this manner, the gas estimator 14 of the gas estimating unit 10 of the embodiment estimates the amount and the composition of gas generated in the secondary battery 20, based on the integration result of the battery voltage and the period of time for which the gas has remained in the secondary battery 20.

After step S22, in step S26, the gas estimating unit 10 determines whether the cumulative amount of gas has reached a first predetermined amount. The first predetermined amount is roughly an amount of gas which does not exceed the tolerance of a known exhaust valve (safety valve) provided in a battery (that is, gas is not exhausted to the outside of the battery). If it is found in step S26 that the cumulative amount of gas has not reached the first predetermined amount, the gas estimating unit 10 returns to step S21 and repeats the above-described operations.

In the above-described example in the embodiment, integrating processing executed when the voltage value of the secondary battery 20 exceeds the upper limit voltage has been discussed with reference to FIG. 5. Likewise, integrating processing may be executed in a similar manner when the temperature of the secondary battery 20 exceeds the upper limit temperature. That is, if it is found in step S22 that the temperature of the secondary battery 20 exceeds the upper limit temperature, in step S24, the gas estimator 14 estimates the amount and the composition of gas generated inside the secondary battery 20, based on the integration result per unit time and the corresponding battery temperature.

If it is found in step S26 that the cumulative amount of gas has reached the first predetermined amount, the gas estimating unit 10 executes gas output processing in step S40, which will be discussed below with reference to FIG. 7.

Figure 7:
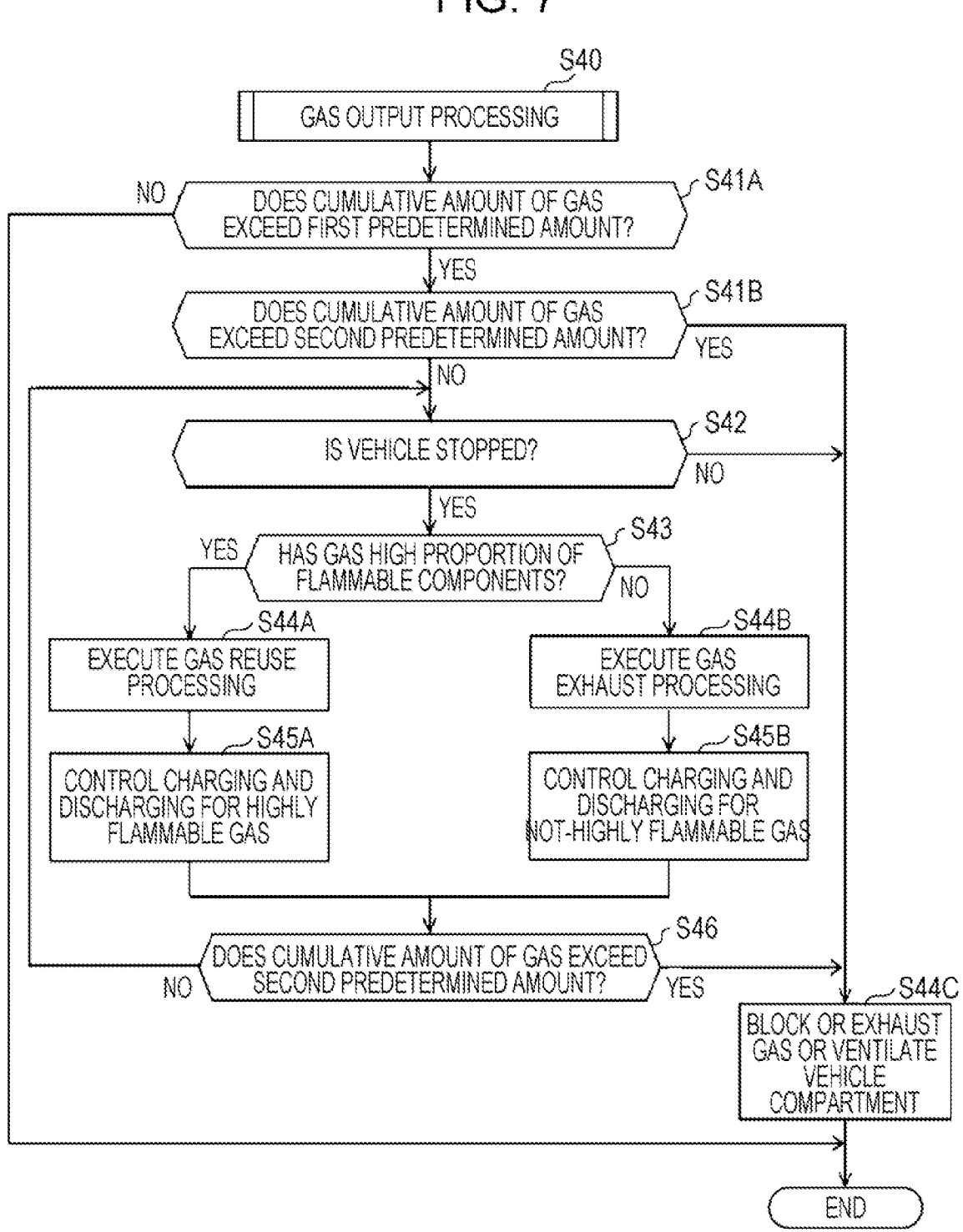
FIG. 7 is a flowchart illustrating gas output processing included in the main procedure in the flowchart of FIG. 3.

In FIG. 7, in step S41A, the gas estimating unit 10 first determines whether the cumulative amount of gas exceeds the above-described first predetermined amount. If it is found in step S41A that the cumulative amount of gas does not exceed the first predetermined amount, the gas output processing is terminated.

If it is found in step S41A that the cumulative amount of gas exceeds the first predetermined amount, the gas estimating unit 10 determines in step S41B whether the cumulative amount of gas exceeds a second predetermined amount. The second predetermined amount is roughly an amount of gas which exceeds the tolerance of a known exhaust valve (safety valve) provided in a battery, that is, gas leaks to the outside of the battery and is detected. A known gas detector sensor may be provided in the vehicle 100 and be used to determine whether the cumulative amount of gas exceeds the second predetermined amount in step S41B.

If it is found in step S41B that the cumulative amount of gas exceeds the second predetermined amount, the gas estimating unit 10 takes safety measures in step S44C. For example, the gas estimating unit 10 blocks or safely exhausts a gas which leaks from the secondary battery 20 or ventilates the vehicle compartment. To block or exhaust the gas leaking from the secondary battery 20 or to ventilate the vehicle compartment, known techniques including those disclosed in JP-A Nos. 2020-198738 and 2010-6153 may be used.

If it is found in step S41B that the cumulative amount of gas does not exceed the second predetermined amount, the gas estimating unit 10 determines in step S42 whether the vehicle 100 is stopped. In one example, the gas estimating unit 10 may determine whether the vehicle 100 is stopped, based on signals from the sensors SR, such as a known vehicle velocity sensor and a known acceleration sensor, installed in the vehicle 100. If it is found in step S42 that the vehicle 100 is not stopped, that is, if the vehicle 100 is moving, the gas estimating unit 10 proceeds to step S44C to take the above-described emergency measures.

If it is found in step S42 that the vehicle 100 is stopped, the gas estimating unit 10 determines in step S43 whether the gas filling the secondary battery 20 has a high proportion of flammable components. In one example, the output controller 15 may make this determination by referring to the cumulative gas data and by determining whether a predetermined condition is satisfied, such as whether the cumulative amount of methane ($CH_4$) is a predetermine value or higher or whether the proportion of methane in the gas composition is a predetermined value or higher.

If it is found in step S43 that the gas filling the secondary battery 20 does not have a high proportion of flammable components, the output controller 15 proceeds to step S44B to execute processing to exhaust the gas inside the secondary battery 20 to the outside. In one example, the output controller 15 executes processing to open the second on/off valve Vb illustrated in FIG. 1 and also to close the first on/off valve Va illustrated in FIG. 1 so as to exhaust the gas inside the secondary battery 20 to the outside of the vehicle 100 via the exhaust valve (safety valve) and the gas outlet pipe 52.

After step S44B, in step S45B, the output controller 15 controls the charging and discharging of the secondary battery 20 in the vehicle 100, which is at a standstill, based on driving conditions preset by preliminary experiment or simulation, so that gas to be generated in the secondary battery 20 maintains a low proportion of flammable components.

After step S45B, in step S46, the output controller 15 determines whether the cumulative amount of gas inside the secondary battery 20 exceeds the second predetermined amount. If the cumulative amount of gas does not exceed the second predetermined amount, the output controller 15 returns to step S42 to continue the gas output processing to deliberately exhaust the gas inside the secondary battery 20 to the outside. That is, in the embodiment, if it is found in step S41A that the gas inside the secondary battery 20 exceeds the first predetermined amount, it is assumed that the gas already fills the secondary battery 20 even though the safety valve is not opened and that the secondary battery 20 is unlikely to satisfy the required specifications as a battery. Hence, thereafter, the secondary battery 20 is deliberately charged and discharged to exhaust the gas so that the cumulative amount of gas exceeds the second predetermined amount.

If it is found in step S43 that the gas filling the secondary battery 20 has a high proportion of flammable components, the output controller 15 proceeds to step S44A to execute gas reuse processing to send the gas inside the secondary battery 20 to the engine 30 as a combustion assisting gas. In one example, the output controller 15 executes processing to open the first on/off valve Va illustrated in FIG. 1 and also to close the second on/off valve Vb illustrated in FIG. 1 to supply the gas inside the secondary battery 20 to the engine 30 via the exhaust valve (safety valve) and the gas inlet pipe 51.

This can output a highly flammable gas from the secondary battery 20 to the air intake channel leading to the engine 30 as a combustion assisting gas. It is thus possible to perform high-efficiency, energy-saving power generation processing using the engine 30.

After step S44A, in step S45A, the output controller 15 controls the charging and discharging of the secondary battery 20 in the vehicle 100, which is at a standstill, based on driving conditions preset by preliminary experiment or simulation, so that gas to be generated in the secondary battery 20 maintains a high proportion of flammable components.

In this manner, the output controller 15 of the gas estimating unit 10 of the embodiment determines the output mode of the gas retained in the secondary battery 20, based on the cumulative amount of each component of the gas estimated as described above, and then controls the opening/closing of the first on/off valve Va and the second on/off valve Vb based on the determined output mode.

This can make effective use of the gas which is generated inside the secondary battery 20 due to an abnormality of the secondary battery 20 or safely exhaust the gas to the outside of the vehicle 100.

While the embodiment of the disclosure has been described above in detail with reference to the accompanying drawings, the disclosure is not restricted to this embodiment.

For example, in the above-described embodiment, in step S43, the gas output mode is determined based on a single parameter, that is, the proportion of flammable components in the gas. However, the gas output mode may be determined based on multiple parameters.

For example, as illustrated in FIG. 8, a first flag indicating whether each component of the gas is flammable and a second flag indicating whether each component of the gas is toxic may be set in the cumulative gas data. In the example in FIG. 8, for oxygen, "1" is set to indicate that it is flammable, while "0" is set to indicate that it is not toxic. Likewise, for other components, such as nitrogen, carbon dioxide, carbon monoxide, and methane, "1" or "0" is set to indicate whether each component is flammable and whether each component is toxic.

The flammability proportion may be calculated by the ratio of the amount of component for which the first flag (flammability flag) is "1" to the amount of the entire gas. Likewise, the toxicity proportion may be calculated by the ratio of the amount of component for which the second flag (toxicity flag) is "1" to the amount of the entire gas.

This makes it possible to easily determine whether the gas accumulated in the secondary battery 20 at a certain time point is more flammable or more toxic.

In this manner, it is apparent that practitioners skilled in the art pertaining to that of the disclosure make various modifications and variations to the embodiment and modified examples without departing from the scope and spirit of the disclosure, and it is understood that such modifications and variations are also encompassed in the technical scope of the disclosure.

According to an embodiment of the disclosure, it is possible to estimate the amount and the composition of gas generated inside a secondary battery at a lower cost.

The controller 10 illustrated in FIG. 2 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the controller 10 including the current measurer 11, the voltage measurer 12, the battery temperature measurer 13, the gas estimator 14, the output controller 15, and the notification controller 16. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 2.

The invention claimed is:

1. A gas estimating unit configured to estimate an amount and a composition of a gas generated inside a secondary battery, the secondary battery being a rechargeable and dischargeable battery, the gas estimating unit comprising:
at least one processor; and
at least one memory electrically coupled to the at least one processor,
the at least one processor configured to:
detect a presence or absence of a gas generating period, the gas generating period being a period for which the gas is generated inside the secondary battery while the secondary battery is in one or both of an overcharging state and a high-temperature state, the overcharging state being a state in which the secondary battery exceeds a voltage limit so as to be unable to be used properly, the high-temperature state being a state in which the secondary battery exceeds a temperature limit so as to be unable to be used properly; and
estimate the amount and the composition of the gas, based on an integration result of voltage values of the secondary battery during the gas generating period.

2. The gas estimating unit according to claim 1, wherein the at least one processor configured to:
in a graph in which a time of the overcharging state is set on a horizontal axis and a voltage value of the secondary battery is set on a vertical axis, integrate the voltage values of a range that exceeds the voltage limit in the graph to derive an integrated area of the range; and estimate the amount and the composition of the gas generated inside the secondary battery by checking the integrated area and a voltage value which corresponds to the integrated area against a prestored voltage value which matches the voltage value corresponding to the integrated area and by referring to a prestored amount and a prestored composition of the gas associated with the prestored matched voltage value.

3. The gas estimating unit according to claim 2, wherein the at least one processor is configured to:

based on the estimated amount and composition of the gas, calculate a cumulative amount of each component of the gas and store the calculated cumulative amount.

4. The gas estimating unit according to claim 3, wherein the at least one processor is configured to:

determine an output mode of the gas retained in the secondary battery, based on the cumulative amount of each component of the gas; and depending on the determined output mode, execute processing to output the gas to an air intake channel leading to an engine as a combustion assisting gas.

5. A vehicle comprising:

an engine configured to drive the vehicle;

a secondary battery configured to be used at least for supplying electricity to a device installed in the vehicle;

a gas inlet pipe configured to couple the secondary battery to an air intake channel leading to the engine;

a first on/off valve configured to control opening and closing of the gas inlet pipe; and the gas estimating unit according to claim 4.

6. The vehicle according to claim 5, further comprising:

a gas outlet pipe configured to communicate the secondary battery to outside of the vehicle; and a second on/off valve configured to control opening and closing of the gas outlet pipe, wherein the gas estimating unit is configured to control opening and closing of each of the first on/off valve and the second on/off valve, based on a composition of the gas.

7. A vehicle comprising:

an engine configured to drive the vehicle;

a secondary battery configured to be used at least for supplying electricity to a device installed in the vehicle;

a gas inlet pipe configured to couple the secondary battery to an air intake channel leading to the engine;

a first on/off valve configured to control opening and closing of the gas inlet pipe; and the gas estimating unit according to claim 3.

8. The vehicle according to claim 7, further comprising:

a gas outlet pipe configured to communicate the secondary battery to outside of the vehicle; and a second on/off valve configured to control opening and closing of the gas outlet pipe, wherein the gas estimating unit is configured to control opening and closing of each of the first on/off valve and the second on/off valve, based on a composition of the gas.

9. A vehicle comprising:

an engine configured to drive the vehicle;

a secondary battery configured to be used at least for supplying electricity to a device installed in the vehicle;

a gas inlet pipe configured to couple the secondary battery to an air intake channel leading to the engine;

a first on/off valve configured to control opening and closing of the gas inlet pipe; and the gas estimating unit according to claim 2.

10. The vehicle according to claim 9, further comprising:

a gas outlet pipe configured to communicate the secondary battery to outside of the vehicle; and a second on/off valve configured to control opening and closing of the gas outlet pipe, wherein the gas estimating unit is configured to control opening and closing of each of the first on/off valve and the second on/off valve, based on a composition of the gas.

11. A vehicle comprising:

an engine configured to drive the vehicle;

a secondary battery configured to be used at least for supplying electricity to a device installed in the vehicle;

a gas inlet pipe configured to couple the secondary battery to an air intake channel leading to the engine;

a first on/off valve configured to control opening and closing of the gas inlet pipe; and the gas estimating unit according to claim 1.

12. The vehicle according to claim 11, further comprising:

a gas outlet pipe configured to communicate the secondary battery to outside of the vehicle; and a second on/off valve configured to control opening and closing of the gas outlet pipe, wherein the gas estimating unit is configured to control opening and closing of each of the first on/off valve and the second on/off valve, based on a composition of the gas.

* * * * *